(No Model.)
J. N. KAILOR.
FEED TABLE FOR CLOVER HULLING MACHINES.
No. 474,134. Patented May 3, 1892.
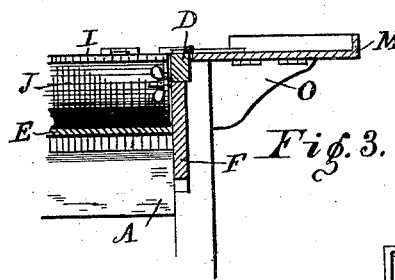
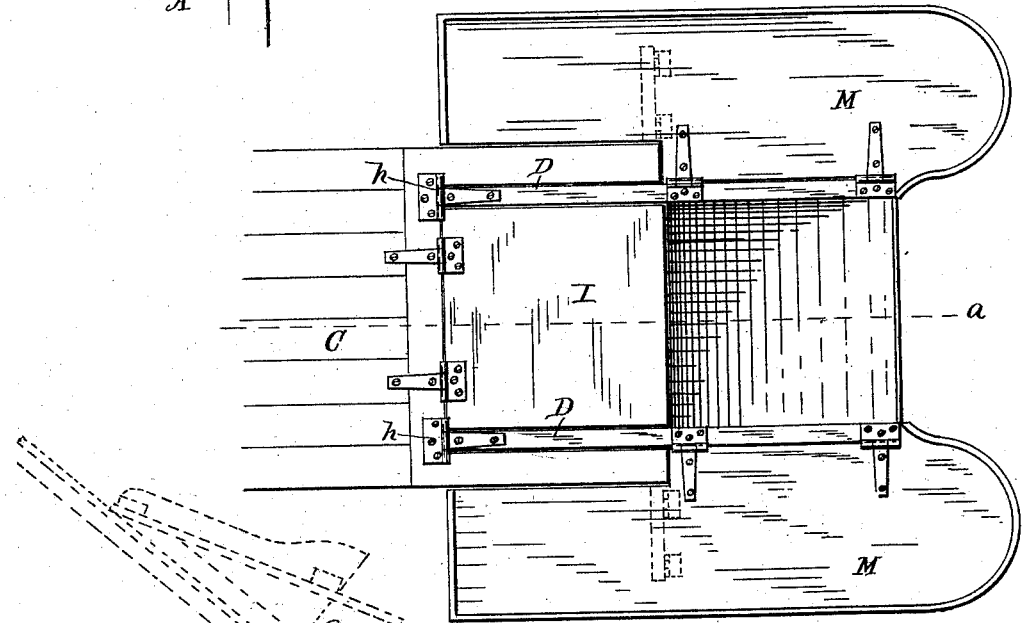
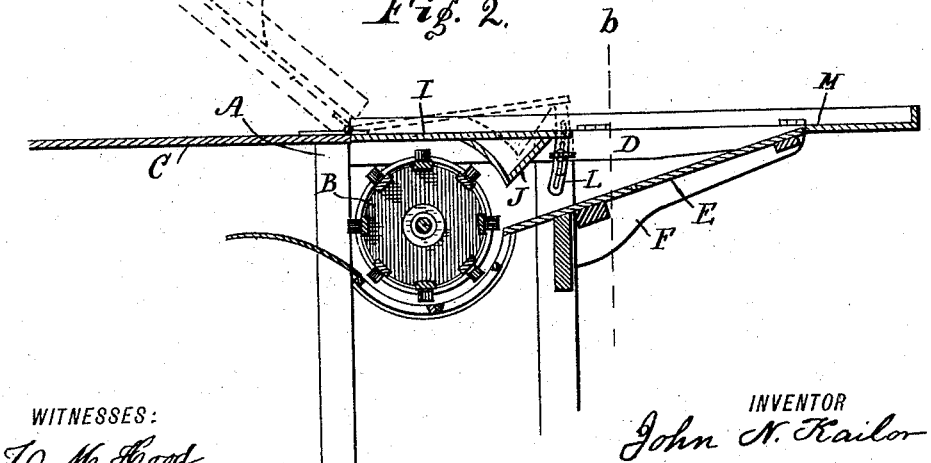
WITNESSES:
INVENTOR
John N. Kailor
BY H. P. Hood,
ATTORNEY.
THE NORRIS PETERS CO., PHOTO-LITHO., WASHINGTON, D. C.

UNITED STATES PATENT OFFICE.

JOHN N. KAILOR, OF COLUMBUS, INDIANA, ASSIGNOR TO REEVES & CO., OF SAME PLACE.

FEED-TABLE FOR CLOVER-HULLING MACHINES.

SPECIFICATION forming part of Letters Patent No. 474,134, dated May 3, 1892.

Application filed October 29, 1891. Serial No. 410,179. (No model.)

*To all whom it may concern:*

Be it known that I, JOHN N. KAILOR, a citizen of the United States, residing at Columbus, in the county of Bartholomew and State of Indiana, have invented a new and useful Improvement in Feed-Tables for Clover-Hulling Machines, of which the following is a specification.

My invention relates to an improvement in the feed-tables of clover-hulling and other like machines.

The object of my improvement is, first, to provide a feed-table for this class of machines which shall present a large area for the support of the material to be operated upon, be foldable into a small space when not in use, and be easily removed, so as to permit free access to the thrashing-cylinder and its concave, and, second, to provide means for adjusting the size of the throat leading to the cylinder, all as hereinafter fully set forth.

The accompanying drawings illustrate my invention.

Figure 1 represents a plan. Fig. 2 represents a vertical section at $a$, Fig. 1. Fig. 3 represents a partial section at $b$, Fig. 2.

In the drawings, A indicates the top portion of the main frame or casing of a clover hulling or thrashing machine.

B is the thrashing-cylinder.

The top portion of the casing is decked over, as at C, except the upper front portion immediately above the cylinder B. A light frame, consisting of a pair of arms D D, connected by an inclined feed-board E, attached to brackets F F, depending from the arms, is mounted above and in front of the cylinder and is hinged to the covered portion of the casing at $h$ $h$, the arrangement being such that the inclined feed-board E is in position to conduct the material to be thrashed to the front of the cylinder and its concave. The space immediately above the cylinder and between the arms D is covered by a separately-hinged platform I, having at its free edge a depending bar J. The front side of bar J forms the upper side of the chute leading to the cylinder. For the purpose of adjusting said chute to different widths vertically, so as to admit a greater or less mass of material to the cylinder at one time, a slotted arm L depends from the under side of the free edge of platform I and is adjustably secured to the inner side of one of the arms D.

A pair of broad leaves M M are hinged to the outer sides of arms D, so as to fold thereon and to present when extended a broad area flush with the top of the main casing for the support of the material to be thrashed. Said leaves when extended are each supported by a bracket O, which is hinged to the under side of the leaf, so as to fold thereon, and which rests when extended against the side of the main frame. When not in use, the leaves M are folded together over the platform I. When it is necessary to gain access to the cylinder and its concave, the whole feed-table is turned back over the main casing, as shown in dotted lines in Fig. 2.

I claim as my invention—

The above-described feed-table for thrashing-machines, consisting of the central frame hinged at one end to the main casing of the thrashing-machine and having at its opposite end an inclined chute, the upper side of which is vertically adjustable, substantially as set forth, and the pair of leaves hinged to opposite sides of said frame and adapted to fold thereon, all combined substantially as set forth.

JOHN N. KAILOR.

Witnesses:
B. M. HUTCHINS,
H. P. HOOD.